(12) United States Patent
Rinkes et al.

(10) Patent No.: US 8,102,264 B2
(45) Date of Patent: Jan. 24, 2012

(54) METHODS AND APPARATUS FOR INVENTORY LOCATION COMPLIANCE

(75) Inventors: Charles Rinkes, Medina, OH (US); Thomas L. Mountjoy, Wadsworth, OH (US); David Mohnke, Willoughby, OH (US); Michael Hulthen, Medina, OH (US)

(73) Assignee: Symbol Technologies, Inc., Holtsville, NY (US)

( * ) Notice: Subject to any disclaimer, the term of this patent is extended or adjusted under 35 U.S.C. 154(b) by 322 days.

(21) Appl. No.: 12/183,853

(22) Filed: Jul. 31, 2008

(65) Prior Publication Data

US 2010/0026493 A1  Feb. 4, 2010

(51) Int. Cl.
*G08B 13/14* (2006.01)
(52) U.S. Cl. ...... 340/572.1; 705/22; 705/28; 340/539.1; 340/10.1
(58) Field of Classification Search .... 340/572.1–572.8, 340/10.1, 539.1; 705/22, 28
See application file for complete search history.

(56) References Cited

U.S. PATENT DOCUMENTS

| | | | |
|---|---|---|---|
| 5,887,176 A * | 3/1999 | Griffith et al. | 340/10.41 |
| 2006/0028352 A1 * | 2/2006 | McNamara et al. | 340/825.49 |
| 2006/0289648 A1 * | 12/2006 | Shafer | 235/375 |
| 2007/0096909 A1 * | 5/2007 | Lally | 340/572.1 |
| 2007/0200701 A1 | 8/2007 | English | |
| 2007/0210923 A1 | 9/2007 | Butler | |
| 2008/0143482 A1 * | 6/2008 | Shoarinejad et al. | 340/10.1 |
| 2008/0284600 A1 * | 11/2008 | Drzaic et al. | 340/572.1 |
| 2009/0037244 A1 * | 2/2009 | Pemberton | 705/8 |

OTHER PUBLICATIONS

PCT Search Report Dated Sep. 23, 2009.
Werb, et al. "The Next Generation of Control: Local Positioning", EDPACS, Auerbach Publishers, NY, NY, vol. 26, No. 8. Feb. 1, 1999, pp. 1-17, XP000997770; ISSN:0736-6981.

* cited by examiner

*Primary Examiner* — Eric M Blount
(74) *Attorney, Agent, or Firm* — Bartholomew DiVita; Terri Hughes Smith

(57) ABSTRACT

An inventory compliance system includes an RFID reader having an agent configured to periodically read all RF tags within its range and then send the resulting tag information to an inventory application that processes the received information (e.g., tag ID, etc.) to determine the state of inventory at that time—i.e., the number, type, and location of each of the tags. In this way, through automatic updating via mobile and stationary RFID readers, an organization is able to monitor inventory without manual intervention, thereby reducing cost and time associated with conventional inventory compliance methods.

20 Claims, 2 Drawing Sheets

METHODS AND APPARATUS FOR INVENTORY LOCATION COMPLIANCE

TECHNICAL FIELD

The present invention relates generally to radio frequency identification (RFID) systems, wireless local area networks (WLANs), and other such networks incorporating RF tags, and, more particularly, to methods of determining the location of RF tags and associated assets.

BACKGROUND

Radio frequency identification (RFID) systems have achieved wide popularity in a number of applications, as they provide a cost-effective way to track the location of a large number of assets in real time. In large-scale applications such as warehouses, retail spaces, and the like, many types of tags may exist in the environment. Likewise, multiple types of readers, such as RFID readers, active tag readers, 802.11 tag readers, Zigbee tag readers, etc., are typically distributed throughout the space in the form of entryway readers, conveyer-belt readers, mobile readers, etc., and may be linked by network controller switches and the like. Similarly, there has been a dramatic increase in demand for mobile connectivity solutions utilizing various wireless components and wireless local area networks (WLANs). This generally involves the use of wireless access points that communicate with mobile devices using one or more RF channels (e.g., in accordance with one or more of the IEEE 802.11 standards).

Notwithstanding these advances, inventory compliance (i.e., the tracking of inventory types, quantities, and locations) remains a significant challenge. Conventionally, inventory updates are provided by manually scanning the barcodes and/or RF tags associated with assets, along with barcodes or RF tags associated with the physical location of those assets (e.g., shelf tags, etc.). This manual process is time-consuming and labor-intensive.

Accordingly, it is desirable to provide improved methods and systems for tracking inventory and associated RF tags. Furthermore, other desirable features and characteristics of the present invention will become apparent from the subsequent detailed description and the appended claims, taken in conjunction with the accompanying drawings and the foregoing technical field and background.

BRIEF SUMMARY

The present invention provides systems and methods for an RFID reader that includes an agent configured to periodically read all RF tags within its range and then send the resulting tag information to an inventory application that processes the received information (e.g., tag ID, etc.) to determine the state of inventory at that time—i.e., the number, type, and location of each of the tags. In this way, through automatic updating via mobile and stationary RFID readers, an organization is able to monitor inventory without manual intervention, thereby reducing cost and time associated with conventional inventory compliance methods.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The present invention generally relates to a method for automatically updating inventory information through the periodic scanning, by stationary and mobile RFID readers, of RF tags in an environment. In this regard, the following detailed description is merely illustrative in nature and is not intended to limit the invention or the application and uses of the invention. Furthermore, there is no intention to be bound by any express or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., radio-frequency (RF) devices, memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques related to signal processing, data transmission, signaling, network control, the 802.11 family of specifications, wireless networks, RFID systems and specifications, and other functional aspects of the system (and the individual operating components of the system) may not be described in detail herein. Furthermore, the connecting lines shown in the various figures contained herein are intended to represent example functional relationships and/or physical couplings between the various elements. Many alternative or additional functional relationships or physical connections may be present in a practical embodiment.

Without loss of generality, in the illustrated embodiment, many of the functions usually provided by a traditional access point (e.g., network management, wireless configuration, etc.) and/or traditional RFID readers (e.g., data collection, RFID processing, etc.) are concentrated in a corresponding RF switch. It will be appreciated that the present invention is not so limited, and that the methods and systems described herein may be used in conjunction with traditional access points and RFID readers or any other device that communicates via RF channels.

Figure 1:
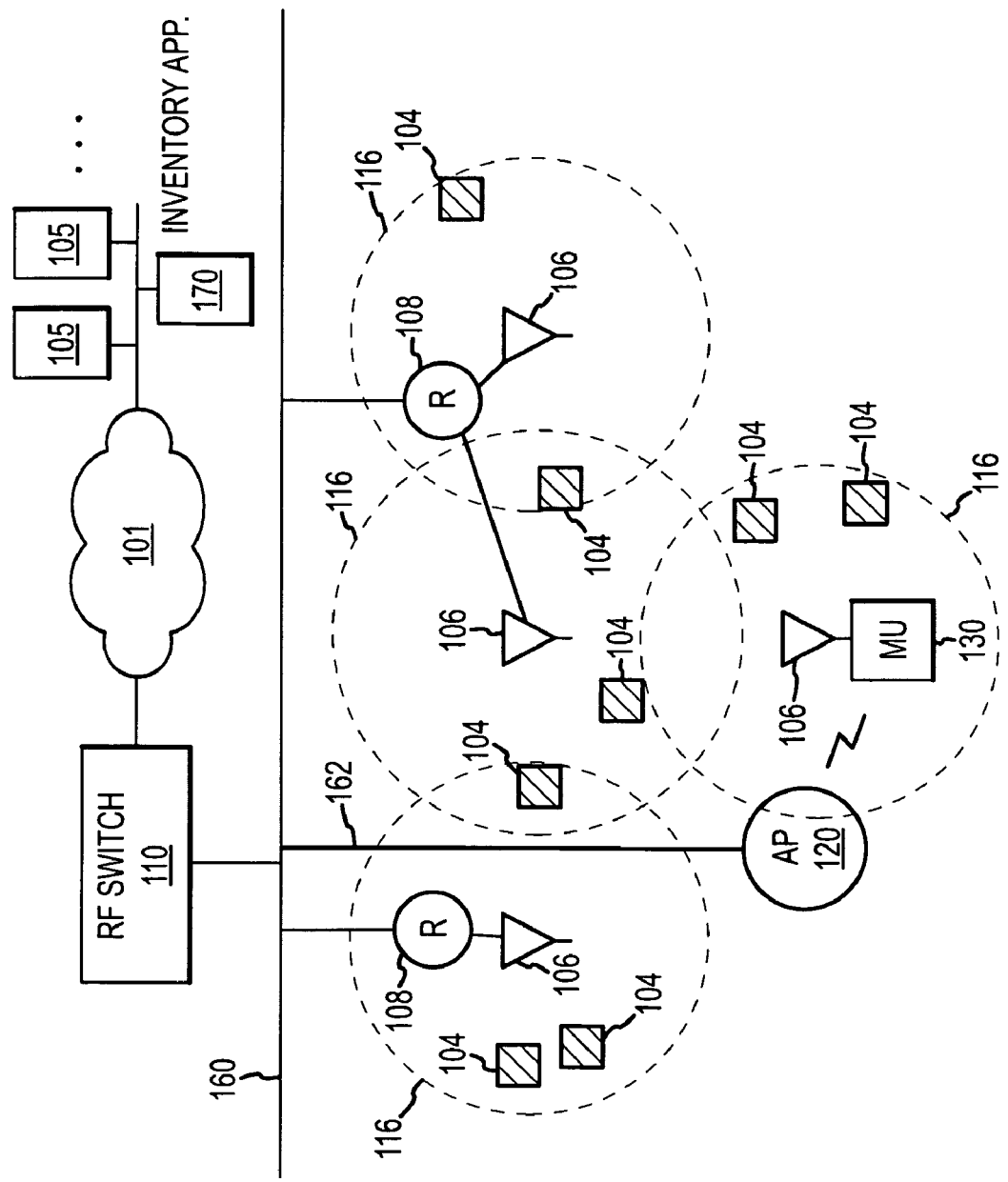
FIG. 1 is a conceptual overview of a system in accordance with an exemplary embodiment of the present invention.

Referring to FIG. 1, in an example system useful in describing the present invention, a switching device 110 (alternatively referred to as an "RF switch," "WS," or simply "switch") is coupled to a network 101 and 160 (e.g., an Ethernet network coupled to one or more other networks or devices) which communicates with one or more enterprise applications 105 and an inventory application 170, which will typically include one or more inventory databases and other such well-known components (not illustrated).

One or more wireless access ports 120 (alternatively referred to as "access ports" or "APs") are configured to wirelessly communicate with one or more mobile units 130 (or "MUs"). AP 120 suitably communicates with switch 110 via appropriate communication lines 160, 162 (e.g., conventional Ethernet lines, or the like). Any number of additional and/or intervening switches, routers, servers and other network components may also be present in the system.

A number of RF tags ("RFID tags," or simply "tags") 104 are distributed throughout the environment. These tags, which may be of various types, are read by a number of RFID readers (or simply "readers") 108 having one or more associated antennas 106 provided within the environment. The term "RFID" is not meant to limit the invention to any particular type of tag. The term "tag" refers, in general, to any RF element that can be communicated with and has an ID (or "ID signal") that can be read by another component. In general, RFID tags (sometimes referred to as "transponders") may be classified as either active, passive, or semi-active. Active tags are devices that incorporate some form of power source (e.g., batteries, capacitors, or the like) and are typically always "on," while passive tags are tags that are exclusively energized via an RF energy source received from a nearby antenna. Semi-active tags are tags with their own power source, but which are in a standby or inactive mode until they receive a signal from an external RFID reader, whereupon they "wake up" and operate for a time just as though they were active tags. While active tags are more powerful, and exhibit a greater range than passive tags, they also have a shorter lifetime and are significantly more expensive. Such tags are well known in the art, and need not be described in detail herein.

RF Switch 110 determines the destination of packets it receives over networks 160 and 101 and routes those packets to the appropriate AP 120 if the destination is an MU 130 with which the AP is associated. Each WS 110 therefore maintains a routing list of MUs 130 and their associated APs 120. These lists are generated using a suitable packet handling process as is known in the art. Thus, each AP 120 acts primarily as a conduit, sending/receiving RF transmissions via MUs 130, and sending/receiving packets via a network protocol with WS 110.

RF switch 110 can support any number of devices that use wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB.

Readers 108, each of which may be stationary or mobile, are suitably coupled via wired or wireless data links to RF switch 110, and may have multiple associated antennas 106. Each antenna 106 has an associated RF range (or "read point") 116, which depends upon, among other things, the strength of the respective antenna 106. The read point 116 corresponds to the area around the antenna in which a tag 104 may be read by that antenna, and may be defined by a variety of shapes, depending upon the nature of the antenna (i.e., the RF range need not be circular or spherical as illustrated in FIG. 1). Furthermore, MU 130, as illustrated in FIG. 1, may incorporate its own RFID reader module such that it is configured to read tags 104 within range and then communicate the resulting tag information to RF switch 110 via AP 120. A reader 108 may also incorporate additional functionality, such as filtering, cyclic-redundancy checks (CRC), and tag writing, as is known in the art.

Figure 2:
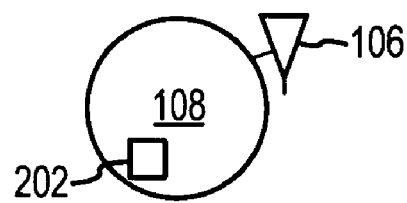
FIG. 2 is a conceptual block diagram of an exemplary RFID reader.

Referring to FIG. 2 in conjunction with FIG. 1, in general, an RFID reader 108 in accordance with the present invention also includes a client side agent (or simply "agent") 202 (FIG. 2), in the form of hardware, software, and/or firmware, that periodically instructs reader 108 to scan its environment and acquire all available tag information within its range. In addition, each reader 108 is configured to operate in conventional mode wherein RF tags are scanned substantially continuously or in response to user input (as with a handheld reader). When scanned, tags 104 send to RFID readers 108 their respective tag information, which may be processed by agent 202. The tag information is then communicated over the network to inventory application 170 and perhaps other enterprise applications 105. Inventory application 170 thereupon processes the received tag information for the purpose of inventory compliance.

It is not uncommon for RF ranges or read points to overlap in real-world applications (e.g., doorways, small rooms, etc.). Thus, as shown in FIG. 1, one read point 116 may overlap with another read point 116. Accordingly, it is possible for a tag 104 to exist within the range of two or more readers, both of which may simultaneously sense the presence of that tag.

As described in further detail below, switch 110 includes hardware, software, and/or firmware capable of carrying out the functions described herein. Thus, switch 110 may comprise one or more processors accompanied by storage units, displays, input/output devices, an operating system, database management software, networking software, and the like. Such systems are well known in the art, and need not be described in detail. Switch 110 may be configured as a general purpose computer, a network switch, or any other such network host. In a preferred embodiment, switch 110 is modeled on a network switch architecture but includes RF network controller software (or "module") whose capabilities include, among other things, the ability to allow configure and monitor readers 108 and antennas 106.

RF switch 110 includes a cell controller (CC) and an RFID network controller (RNC). In general, the RNC includes hardware and software configured to handle RFID data communication and administration of the RFID network components, while the CC includes hardware and software configured to handle wireless data (e.g., in accordance with IEEE 802.11) from the mobile units and access ports within wireless cells. In one embodiment, RF switch 110 includes a single unit with an enclosure containing the various hardware and software components necessary to perform the various functions of the CC and RNC as well as suitable input/output hardware interfaces to networks 101 and 160.

Figure 3:
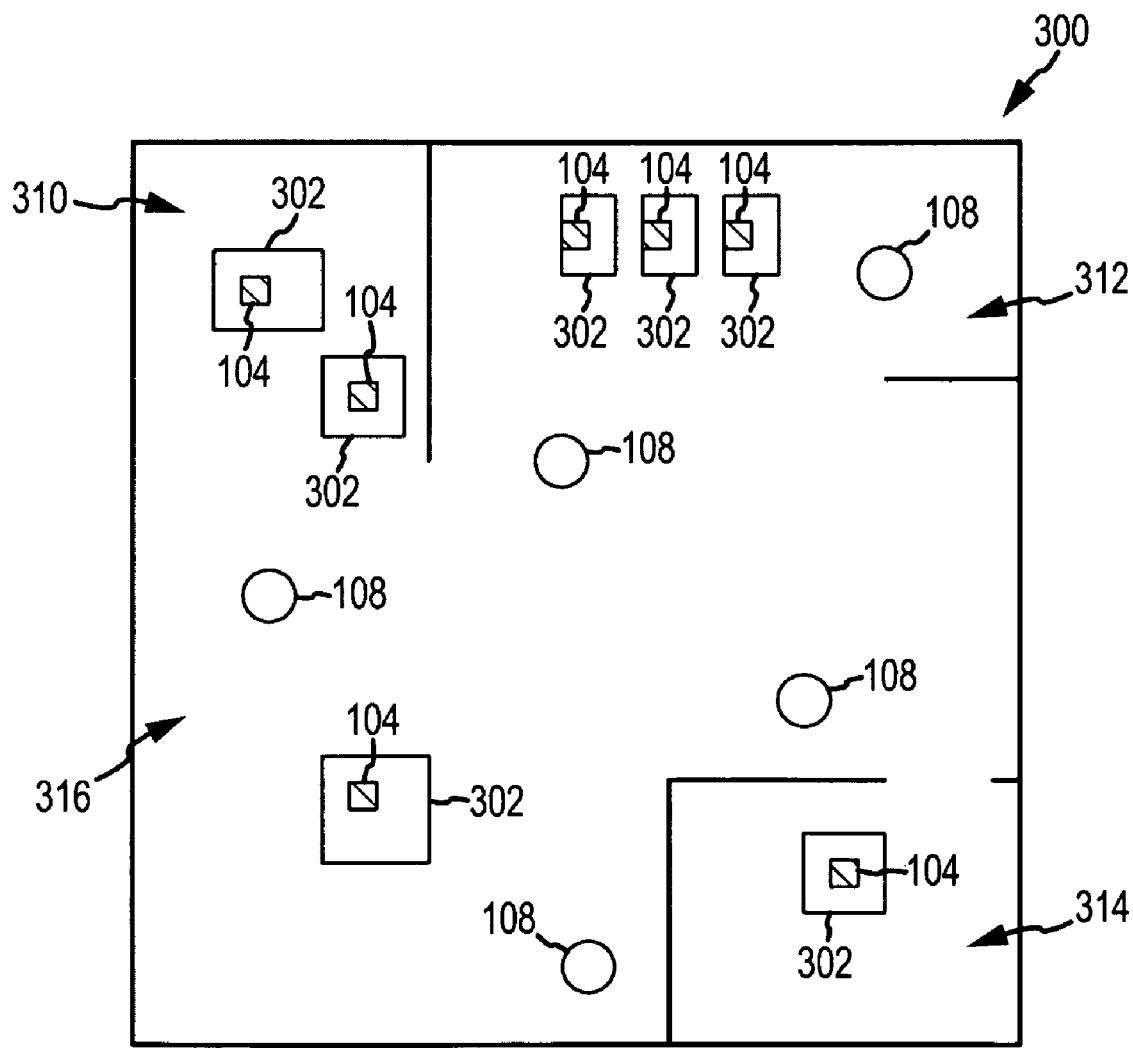
FIG. 3 depicts an exemplary environment in which the present invention may be employed.

FIG. 3 depicts an example environment 300 (e.g., a warehouse, office, or the like) containing multiple assets 302, each having an associated RF tag 104. The environment 300 will typically be partitioned into various rooms or regions (e.g., regions 310, 312, 314, and 316). Assets 302 will typically be moved into and out of environment 300 from time to time, and will also typically be moved to different locations within environment 300. It is therefore desirable to know, in substantially real time, which assets 302 are within environment 300, as well as the location of each of the assets 302.

One or more readers 108 are distributed throughout environment 300. Some may be stationary (and located in known locations), while others may be mobile (hand-held, attached to vehicles, etc.). In accordance with the present invention, one or more of readers 108 include an agent (agent 202 illustrated in FIG. 2) that periodically reads all RF tags within its range, then sends the resulting tag information to inventory application 170 (FIG. 1). Inventory application 170 then processes the received information (e.g., tag ID, etc.) to determine the state of inventory at that time—i.e., the number, type, and location of each of the tags 104 (and consequently, assets 302).

The term "periodic" as used in connection with agent 202 means occurring from time to time, but not necessarily at regular intervals. That is, agent 202 may be configured to read RF tags randomly, regularly, or in any desired manner. In one embodiment, when agent 202 determines that its particular RF reader 108 is not being used for another task, it initiates one or more scans for RF tags and sends the resulting tag information to the inventory application.

Locationing, as performed by the RF switch 110, and as used by inventory application 170, generally involves examining all of the RFID tag data available at a particular time and then using rules and locationing algorithms to determine the most likely location of the tags associated with the tag data. Such locationing typically involves utilizing various ranging techniques to determine symbolic distance or range measurement coupled with position estimation techniques that derive position estimates from collection of reference points and their associated range measurements.

It should be appreciated that the example embodiment or embodiments described herein are not intended to limit the scope, applicability, or configuration of the invention in any way. For example, these methods may be used in connection with standard barcode readers and the like. In general, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. An inventory compliance system comprising:
    a plurality of RF tags associated with a respective plurality of assets within an environment;
    an inventory application coupled to a network;
    a plurality of RFID readers provided within the environment, each having a range, wherein each of the RFID readers comprises an agent configured to periodically, in an intermittent fashion, instruct the RFID reader to acquire tag information from those RF tags that are within the range and then transmit the tag information over the network to the inventory application;
    wherein each of the plurality of RFID readers is configured to operate in a first mode comprising conventional operation where an RFID reader acquires tags substantially continuously or based upon user input and in a second mode where the agent is configured to operate the RFID reader when the RFID reader is not being used for another task, and wherein the RFID reader is not synchronized with the tags in the second mode prior to acquiring the tag information.

2. The inventory compliance system of claim 1, wherein the inventory application is configured to receive the tag information and determine the type, number, and location of the assets within the environment.

3. The inventory compliance system of claim 1, wherein the plurality of RFID readers comprises at least one mobile RFID reader and at least one stationary RFID reader.

4. The inventory system of claim 1, further comprising a wireless switch coupled to the network, the wireless switch comprising a locationing subsystem configured to determine the locations of the plurality of RF tags.

5. The inventory compliance system of claim 1, wherein the agent is configured to instruct the RFID reader to acquire tag information when it determines that the RFID reader is not performing another RF reading task.

6. The inventory compliance system of claim 1, wherein the agent is configured to instruct the RFID reader to acquire tag information at regular intervals.

7. The inventory compliance system of claim 6, wherein the regular intervals are configurable by a user.

8. An RFID reader comprising an agent configured to automatically and intermittently instruct the RFID reader to acquire tag information from a plurality of RF tags that are within a range and then transmit the tag information over a network to an inventory application, wherein the RFID reader is configured to operate in a first mode comprising conventional operation where the RFID reader acquires tags substantially continuously or based upon user input and in a second mode where the agent is configured to operate the RFID reader when the RFID reader is not being used for another task, and wherein the RFID reader is not synchronized with the tags in the second mode prior to acquiring the tag information.

9. The RFID reader of claim 8, wherein the RFID reader is mobile.

10. The RFID reader of claim 8, wherein the RFID reader is stationary.

11. The RFID reader of claim 8, wherein the agent is configured to instruct the RFID reader to acquire tag information when it determines that the RFID reader is not performing another RF reading task.

12. The inventory compliance system of claim 8, wherein the agent is configured to instruct the RFID reader to acquire tag information at regular intervals.

13. A method for determining the state of inventory for a plurality of assets having a plurality of associated RF tags associated therewith, the method comprising:
    providing a plurality of RFID readers, each configured to respond to a request to acquire tag information from a set of the RF tags within its range, wherein each of the plurality of RFID readers is configured to operate in a first mode comprising conventional operation where an RFID reader acquires tags substantially continuously or based upon user input and in a second mode where an agent is configured to operate the RFID reader when the RFID reader is not being used for another task, and wherein the RFID reader is not synchronized with the tags in the second mode prior to acquiring the tag information;
    in the second mode, intermittently and automatically sending to the RFID readers a request to acquire tag information;
    sending the acquired tag information over a network to an inventory application;
    determining the location of the set of the RF tags; and
    determining the state of inventory based on the tag information and the location of the set of the RF tags.

14. The method of claim 13, wherein determining the state of inventory comprises determining the type, number, and location of the assets within the environment.

15. The method of claim 13, wherein the plurality of RFID readers comprises at least one mobile RFID reader and at least one stationary RFID reader.

16. The method of claim 13, further comprising providing a wireless switch coupled to the network, the wireless switch comprising a locationing subsystem configured to perform the step of determining the location of the set of the RF tags.

17. The method of claim 13, wherein the request to acquire tag information is sent to the RFID reader when the RFID reader is not engaged in another reading task.

18. The method of claim 13, wherein the request to acquire tag information is sent to the RFID reader at regular intervals.

19. The inventory compliance system of claim 1, further comprising:
a wireless switch coupled to the network and located between the inventory application and the plurality of RFID readers, wherein stationary RFID readers of the plurality of RFID readers are coupled to the wireless switch via the network; and
a access point coupled to the network and the wireless switch, the access point configured to communicate with mobile RFID readers of the plurality of RFID readers;
wherein the wireless switch is configured to monitor and control the plurality of RFID readers and to communicatively coupled the plurality of RFID readers to the inventory application or one or more enterprise applications.

20. The inventory compliance system of claim 1, wherein each of the plurality of RFID readers is configured to operate in the second mode where the agent is configured to operate the RFID reader without coordinating with the RF tags prior to acquiring the tag information.

* * * * *

UNITED STATES PATENT AND TRADEMARK OFFICE
CERTIFICATE OF CORRECTION

| | | |
|---|---|---|
| PATENT NO. | : 8,102,264 B2 | Page 1 of 1 |
| APPLICATION NO. | : 12/183853 | |
| DATED | : January 24, 2012 | |
| INVENTOR(S) | : Rinkes et al. | |

It is certified that error appears in the above-identified patent and that said Letters Patent is hereby corrected as shown below:

In Column 6, Line 1, in Claim 4, delete "inventory system" and insert -- inventory compliance system --, therefor.

Signed and Sealed this
Eighteenth Day of December, 2012

David J. Kappos
*Director of the United States Patent and Trademark Office*